(12) United States Patent
Chen et al.

(10) Patent No.: US 8,872,803 B2
(45) Date of Patent: Oct. 28, 2014

(54) OPTICAL TOUCH SYSTEM AND TOUCH OBJECT SEPARATING METHOD THEREOF

(71) Applicant: Wistron Corporation, New Taipei (TW)

(72) Inventors: Shih-Wen Chen, New Taipei (TW); Shang-Chin Su, New Taipei (TW)

(73) Assignee: Wistron Corporation, New Taipei (TW)

( * ) Notice: Subject to any disclaimer, the term of this patent is extended or adjusted under 35 U.S.C. 154(b) by 85 days.

(21) Appl. No.: 13/676,136

(22) Filed: Nov. 14, 2012

(65) Prior Publication Data

US 2014/0015800 A1 Jan. 16, 2014

(30) Foreign Application Priority Data

Jul. 16, 2012 (TW) .............................. 101125540 A

(51) Int. Cl.
G06F 3/042 (2006.01)
G06F 3/041 (2006.01)

(52) U.S. Cl.
CPC .... G06F 3/0421 (2013.01); G06F 2203/04104 (2013.01); G06F 3/0425 (2013.01); G06F 3/0416 (2013.01)
USPC ......................................................... 345/175

(58) Field of Classification Search
None
See application file for complete search history.

(56) References Cited

U.S. PATENT DOCUMENTS

| 4,782,328 | A | 11/1988 | Denlinger |
| 2010/0321340 | A1 | 12/2010 | Hsiao et al. |
| 2011/0050649 | A1 | 3/2011 | Newton et al. |
| 2011/0169853 | A1* | 7/2011 | Oiwa et al. ..................... 345/589 |
| 2011/0304699 | A1* | 12/2011 | Ito et al. .......................... 348/47 |

OTHER PUBLICATIONS

"Office Action of Taiwan Counterpart Application", issued on Jun. 24, 2014, with English translation thereof, pp. 1-8.

* cited by examiner

Primary Examiner — Adam R Giesy
Assistant Examiner — Henok Heyi
(74) Attorney, Agent, or Firm — Jianq Chyun IP Office

(57) ABSTRACT

An optical touch system and a touch object separating method thereof are provided. First, touch object images in a first and a second captured image of a first and a second lens are recognized. When the first captured image includes two touch object images and the second captured image includes a single touch object image, a first distance between a leftmost end and a rightmost end of the two touch object images in the first captured image, a second distance between centers of the two touch object images, and a third distance between a leftmost end and a rightmost end of the single touch object image in the second captured image are calculated. A fourth distance corresponds to the third distance is calculated according to a ratio of the first distance to the second distance and used to separate the single touch object images into two touch object images.

10 Claims, 4 Drawing Sheets

OPTICAL TOUCH SYSTEM AND TOUCH OBJECT SEPARATING METHOD THEREOF

CROSS-REFERENCE TO RELATED APPLICATION

This application claims the priority benefit of Taiwan application serial no. 101125540, filed on Jul. 16, 2012. The entirety of the above-mentioned patent application is hereby incorporated by reference herein and made a part of this specification.

BACKGROUND OF THE INVENTION

1. Field of the Invention

The present invention relates to a touch system and a method thereof. More particularly, the present invention relates to an optical touch system supporting multi-touch and a touch object separating method thereof.

2. Description of Related Art

Along with the spread of Windows 7 operating system, all-in-one PC (AIO PC) with multi-touch function has gradually become the mainstream product in the market. Capacitive touch monitor offers the best touch control effect among all existing resistive, capacitive, and rear projection touch monitors. However, the cost of capacitive touch monitor is the highest and is increased along with the increase of screen size, which renders the usage benefit of the capacitive touch monitor become less economical.

In order to find a substitution for the capacitive touch monitor, an optical touch monitor which uses a light-sensitive device or an optical lens to detect a touch position is provided. Such optical touch monitor offers low cost and high accuracy, and therefore is more competitive in the market. Accordingly, the optical touch monitor has become one of the most popular large-scale touch monitors.

The optical touch monitor adopts a plurality of optical lenses disposed around the edge of the screen for capturing the image of the finger of the user operating the monitor, and analyzing the position of the shadow in the captured image caused by the finger shielding the light, so as to obtain a relative angle of the touch point of the finger to the optical lens. Finally, the optical touch monitor calculates the precise position of the touch points according to the known distance between the optical lenses by using the triangulation method.

In the application of the single-touch detection, the above-mentioned method for recognizing the position of the finger according to the shadow of the finger has reached fairly high accuracy. However, in the application of multi-touch detection, since the fingers is very close, at certain angles, the positions of different fingers in the image captured by the optical lenses may be overlapped, or even shielded by another finger, which leads to the optical touch monitor wrongly determining the operation as single-touch operation.

For example, FIG. 1 is a schematic view of a conventional optical touch monitor detecting a touch of a finger. Referring to FIG. 1, in the conventional optical touch monitor 10, the optical lenses 12 and 13 are respectively disposed at corners of the same side, for example, an upper left corner and an upper right corner, of the screen 11, and the optical lenses 12 and 13 face toward another side of the screen 11 to capture the gesture of the user operating the screen 11. Herein, when the user uses two fingers 14 and 15 to touch the screen 11, because the position of the finger 14 is located right between the optical lens 12 and the finger 15, the finger 15 is shielded. Accordingly the optical touch monitor 10 can only recognize the image of the finger 14 instead of the image of the finger 15 from the images captured by the optical lens 12, which subsequently causes the position of the finger 15 detected by the optical touch monitor 10 to be shifted, and accordingly affects the accuracy of the multi-touch recognition of the optical touch monitor.

SUMMARY OF THE INVENTION

Accordingly, the present invention provides an optical touch system and a touch object separating method thereof, which improves the accuracy of the multi-touch recognition of the optical touch system.

The present invention provides a touch object separating method of an optical touch system, adapted to the optical touch system having a first lens, a second lens and a screen, wherein the first lens and the second lens are disposed on the same side of the screen and face toward another side of the screen. In the method, at least one touch object image in a first captured image and a second captured image captured by the first lens and the second lens is recognized. When the first captured image includes two touch object images and the second captured image includes a single touch object image, a first distance between a leftmost end and a rightmost end of the two touch object images in the first captured image, a second distance between the centers of the two touch object images, and a third distance between a leftmost end and a rightmost end of the single touch object image in the second captured image are calculated. Then, a fourth distance corresponding to the third distance is calculated according to a ratio of the first distance to the second distance. Finally, the single touch object image is separated into two touch object images according to the calculated forth distance, and the two touch object images in the first captured image are combined with the separated two touch object images for calculating positions of two touch points of the touch object touching the screen.

According to an embodiment of the present invention, the step of separating the single touch object image into two touch object images according to the forth distance includes calculating a position of a center of the single touch object image in the second captured image, and calculating the positions of the center being moved left and right by a half of the fourth distance to serve as the positions of the centers of the separated two touch object images.

According to an embodiment of the present invention, the step of separating the single touch object image into two touch object images according to the forth distance further calculates the positions of the centers of the two touch object images in the second captured image and a fifth distance between a leftmost end and a rightmost end of the single touch object image in the second captured image, and taking two times of the fifth distance as the width of the two touch object images.

The present invention provides an optical touch system including a screen, a first lens, a second lens and a control unit. The first lens and a second lens are disposed on the same side of the screen and face toward another side of the screen for capturing at least one touch object image above the screen. The control unit is coupled to the first lens and the second lens and includes an image recognizing module, a calculating module, a touch object separating module and a touch point position calculating module. The image recognizing module is configured to recognize the at least one touch object image in a first captured image and a second captured image captured by the first lens and the second lens. When the first captured image includes two touch object images and the second captured image includes a single touch object image, the calculating module calculates a first distance between a leftmost end and a rightmost end of the two touch object images in the first captured image, a second distance between two centers of the two touch object images, and a third distance between a leftmost end and a rightmost end of the single touch object image in the second captured image, and a fourth distance corresponding to the third distance according to a ratio of the first distance to the second distance. The touch object separating module separates the single touch object image in the second captured image into two touch object images according to the fourth distance. The touch point position calculating module combines the two touch object images in the first captured image and the separated two touch object images in the second captured image to calculate positions of two touch points of the at least one touch object touching the screen.

According to an embodiment of the present invention, the touch object separating module includes calculating a position of a center of the single touch object image in the second captured image, and calculating two positions of the center being moved left and right by a half of the fourth distance as the positions of the centers of the separated two touch object images.

According to an embodiment of the invention, the touch object separating module further calculates the positions of the centers of the two touch object images in the second captured image and a fifth distance between a leftmost end and a rightmost end of the single touch object image in the second captured image, and takes two times of the fifth distance as the width of the two touch object images.

According to an embodiment of the present invention, the ratio of the first distance to the second distance is equal to the ratio of the third distance to the fourth distance.

According to an embodiment of the present invention, the optical touch system is optical touch monitor.

In light of the foregoing descriptions, in the present invention, the optical touch system and the touch object separating method thereof detect the touch object in the images captured by two optical lens of the optical touch system. When a single touch object and two touch objects are respectively appeared in two images, the single touch object image is separated into two touch objects according to the ratio relationship of the two touch objects appeared in the image for calculating the positions of the two touch points so as to enhance the accuracy of the multi-touch recognition of the optical touch system.

In order to make the aforementioned and other features and advantages of the invention more comprehensible, embodiments accompanying figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

In the images captured by two lens of the optical touch system, if a single touch object and two touch objects are respectively appeared, it represents that there are actually two touch objects touching the screen. However, since the positions of the two touch objects are overlapped at certain view of the lens, only one touch object is appeared in the image captured by that lens. Therefore, the present invention calculates the distance between the two touch objects in the image where only a single touch object is appeared according to the ratio relationship between the two touch object images in the image where two touch objects are appeared, so as to separate the single touch object image into two touch objects. Thus, the accuracy of the multi-touch recognition of the optical touch system can be improved.

Figure 1:
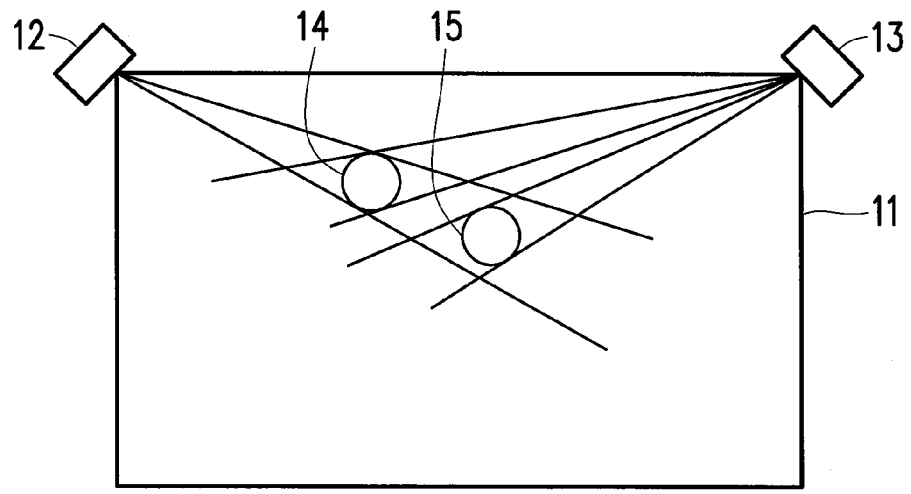
FIG. 1 is a schematic view of a conventional optical touch monitor detecting a touch of a finger.
Figure 2:
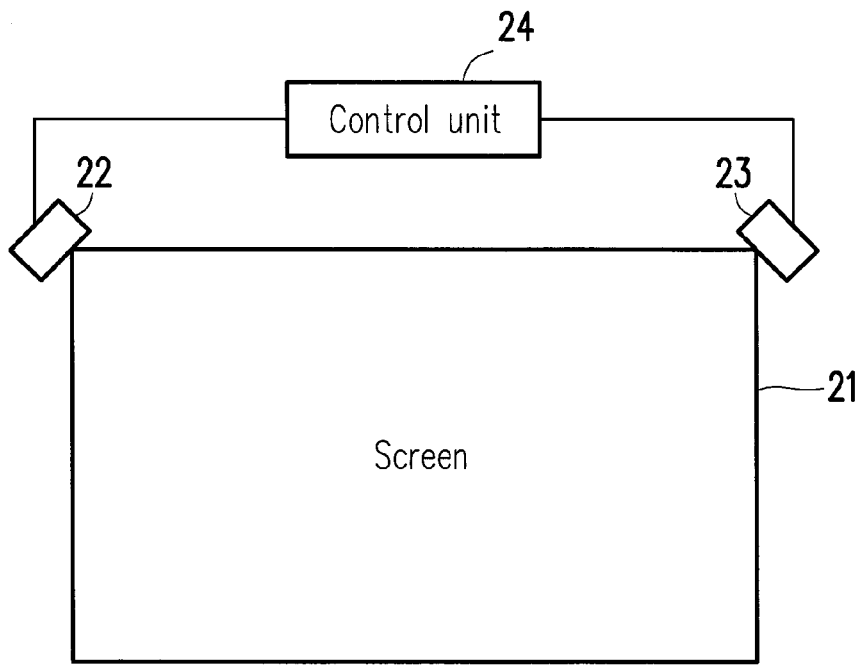
FIG. 2 is a block diagram of an optical touch system according to an embodiment of the present invention.

FIG. 2 is a block diagram of an optical touch system according to an embodiment of the present invention. Referring to FIG. 2, the optical touch system 20 of the present embodiment is, for example, optical touch monitor (OTM) which includes a screen 21, a first lens 22, a second lens 23 and a control unit 24. The functions of the above-mentioned components are represented as follows.

The screen 21 is, for example, liquid crystal display (LCD), light-emitting diode (LED) display, field emission display (FED) or other types of displays which can display the operation image for users to perform operation by fingers.

The first lens 22 and the second lens 23 are optical lenses adopting photosensitive device, such as charge coupled device (CCD), complementary metal oxide semiconductor (CMOS), to capture images. The first lens 22 and the second lens 23 are disposed on the same side of the screen 24, for example, the left and right corners of the upper side, and face toward another side of the screen 24, for example, the two corners of the lower side, for capturing the images of the at least one touch object operating the screen.

The control unit 24 is, for example, central processing unit (CPU), microprocessor, digital signal processor (DSP), application specific integrated circuits (ASIC) or other similar devices. The control unit 24 is respectively coupled to the first lens 22 and the second lens 23 for receiving and analyzing the images captured by the first lens 22 and the second lens 23 so as to calculate the positions of two touch points of the touch object touching the screen 21.

Figure 3:
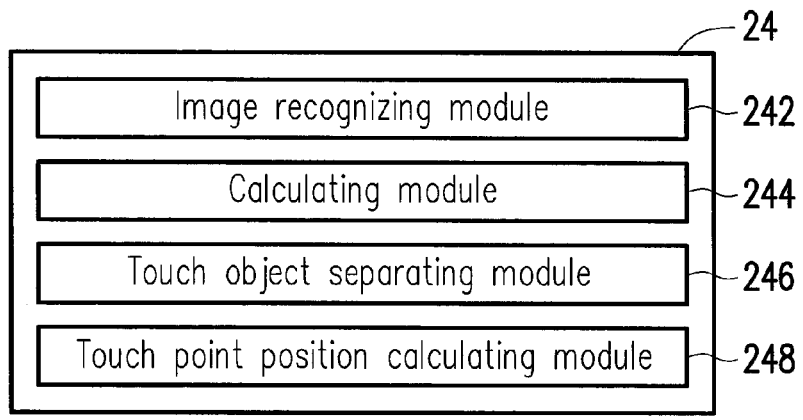
FIG. 3 is a block diagram of the control unit according to one embodiment of the present invention.
Figure 4:
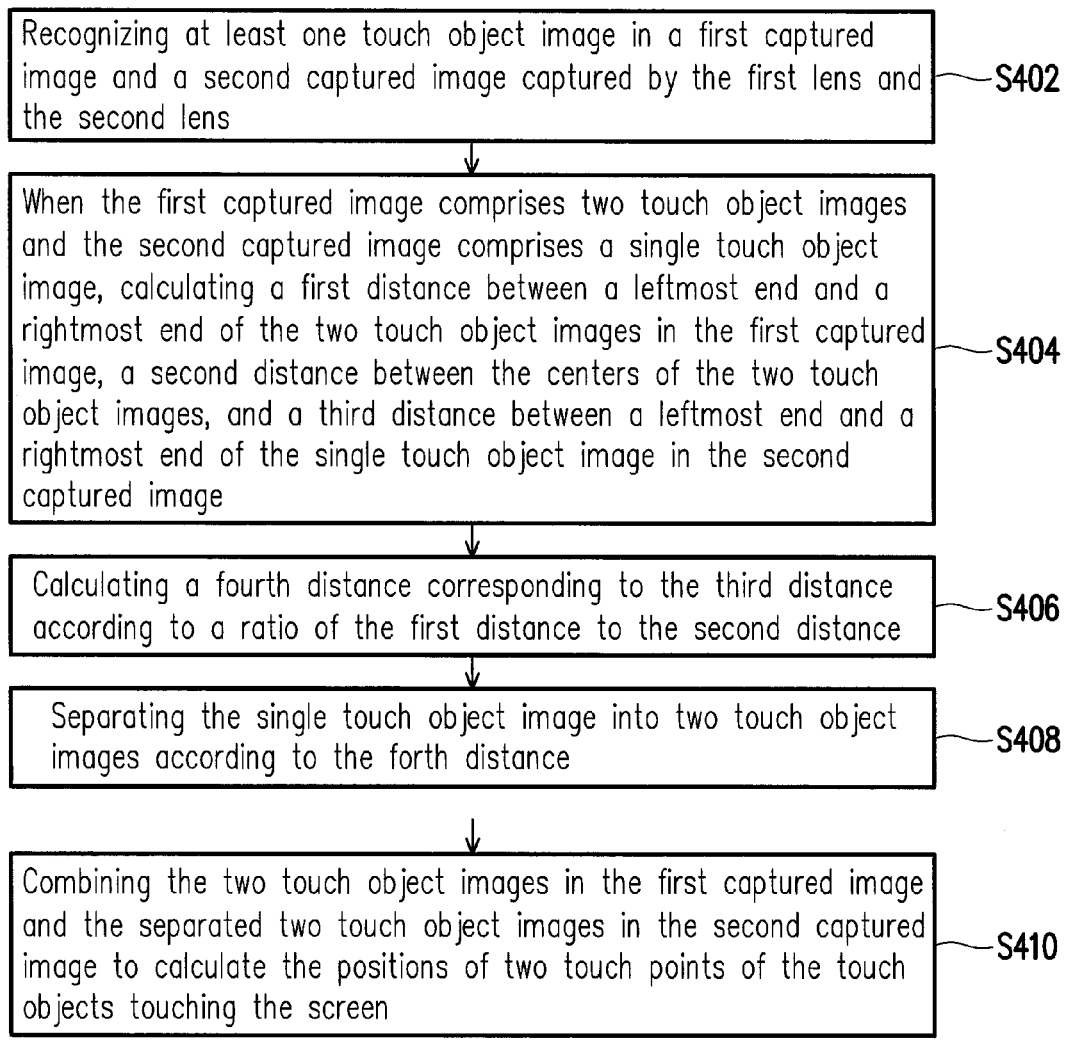
FIG. 4 is a flowchart of a touch object separating method of an optical touch system according to an embodiment of the present invention.

In detail, FIG. 3 is a block diagram of the control unit according to one embodiment of the present invention. FIG. 4 is a flowchart of a touch object separating method of an optical touch system according to an embodiment of the present invention. Referring to FIG. 2, FIG. 3 and FIG. 4 at the same time, the present embodiment further separates the control unit 24 of FIG. 2 into an image recognizing module 242, a calculating module 244, a touch object separating module 246 and a touch point position calculating module 248. The steps of the touch object separating method of the present embodiment are illustrated below with each component in aforesaid figures.

First of all, in step S402, the image recognizing module 242 recognizes at least one touch object image in a first captured image and a second captured image captured by the first lens 22 and the second lens 23. Herein, the image recognizing module 242, for example, can perform image processing such as rotating, shifting, or shear distortion, to the first captured image and the second captured image, so as to recognize the touch object. The image recognizing module 242 can further calculates the position of the touch point of the touch object actually touching the screen 21 according to the position of the touch object appeared on the horizontal axis (i.e., X-axis), of the first captured image and the second captured image.

When the image recognizing module 242 recognizes that the first captured image includes two touch object images and the second captured image includes a single touch object image, the calculating module 244 further calculates a first distance between a leftmost end and a rightmost end of the two touch object images in the first captured image, a second distance between the centers of the two touch object images, and a third distance between a leftmost end and a rightmost end of the single touch object image in the second captured image (Step S404), so as to calculate a fourth distance corresponding to the third distance according to the ratio of the first distance to the second distance (Step S406). Herein, the ratio of the first distance to the second distance is equal to the ratio of the third distance to the fourth distance.

Figure 5:
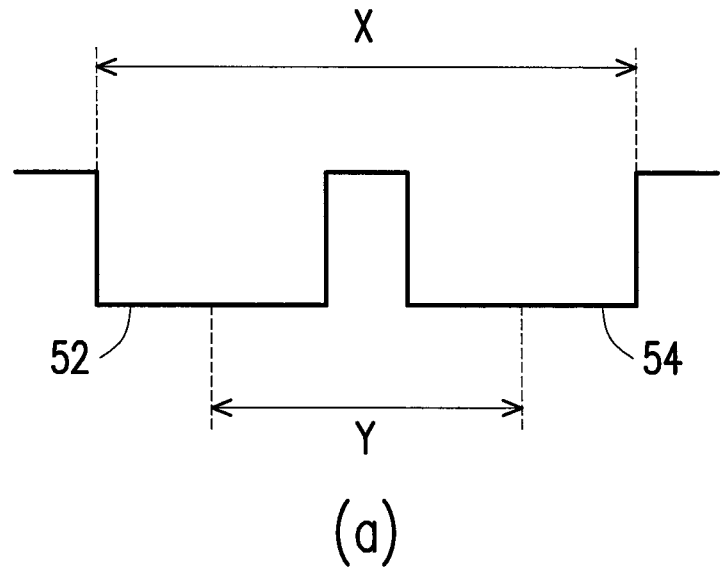
FIG. 5(a) and FIG. 5(b) are examples of a touch object separating method of an optical touch system according to an embodiment of the present invention.
Figure 5:
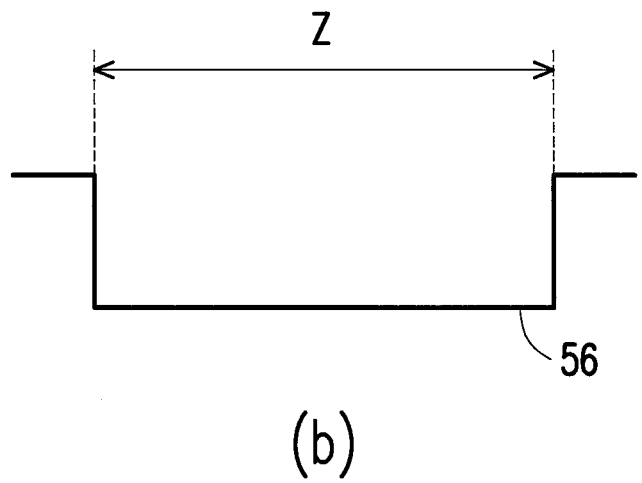

For example, FIG. 5(a) and FIG. 5(b) are examples of a touch object separating method of an optical touch system according to an embodiment of the present invention. Referring to FIG. 5(a) and FIG. 5(b) at the same time, in the present embodiment, the two touch object images and the single touch object image recognized by the above-mentioned image recognizing module 242 are illustrated as the waveforms shown in FIG. 5(a) and FIG. 5(b) in a form of digital signal. Herein, the two pull-down waveforms 52, 54 in FIG. 5(a) represent two touch objects appeared in the first captured image. The pull-down waveform 56 in FIG. 5(b) represents a single touch object appeared in the second captured image. Thus, the calculating module 244 calculates the distance X between a leftmost end and a rightmost end of the two waveforms 52, 54 in FIG. 5(a), the distance Y between the centers of the two waveforms 52, 54, and the distance Z between a leftmost end and a rightmost end of the waveform 56 in FIG. 5(b), and then calculates the distance W corresponding to the distance Z according to the formula listed below:

$$\frac{Y}{X} = \frac{W}{Z} \quad (1)$$

wherein, the ratio of the distance X to the distance Y is equal to the ratio of the distance Z to the distance W.

Next, the touch object separating module 246 separates the single touch object image in the second captured image into two touch object images according to the fourth distance calculated by the calculating module 244 (Step S408). Herein, the touch object separating module 246, for example, calculates a position of the center of the single touch object image in the second captured image, and then calculates two positions of the center being moved left and right by a half of the fourth distance and taking the calculated positions as the positions of the centers of the separated two touch object images. In addition, the touch object separating module 246 further calculates the positions of the centers of the two touch object images in the second captured image and a fifth distance between a leftmost end and a rightmost end of the single touch object image in the second captured image, and accordingly take two times of the fifth distance as a width of the two touch object images.

Figure 6:
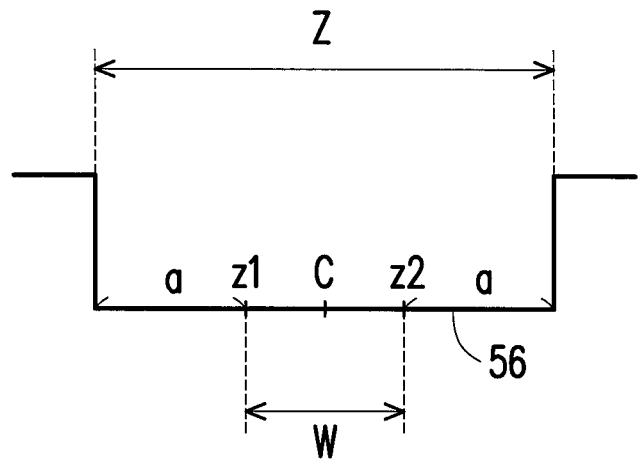
FIG. 6(a) and FIG. 6(b) are examples of a touch object separating method according to an embodiment of the present invention.
Figure 6:
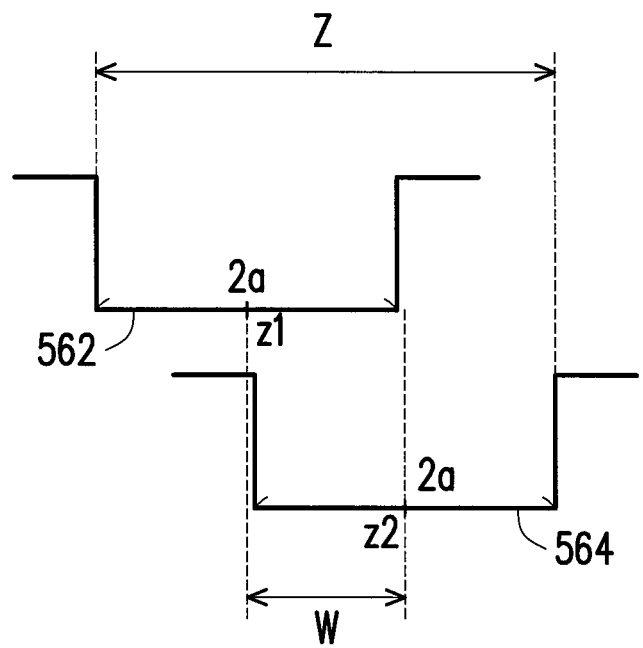

For example, FIG. 6(a) and FIG. 6(b) are examples of a touch object separating method according to an embodiment of the present invention. Referring to FIG. 6(a), regarding the waveform 56 of the singe touch object in the second captured image shown in FIG. 5(b), the present embodiment calculates the positions z1 and z2 of the center C being moved left and right by a half of the distance W to serve as the positions of the centers of the separated two touch object images 562, 564. The present embodiment further calculates the positions z1 and z2 of the centers of the two touch object images and a distance a between the leftmost end and the rightmost end of the single touch object in the second captured image, and takes two times of the distance a (i.e., 2a) as the width of the two touch object images (as shown in FIG. 6(b)).

By the method described above, the two touch object images originally overlapped with each other in the second captured image are separated. Finally, the touch point position calculating module 248 combines the two touch object images in the first captured image and the separated two touch object images in the second captured image, so as to calculate the positions of two touch points of the touch object touching the screen 21 (Step S410). Herein, the touch object image in the second captured image is separated into two touch object images. Thus, the positions of the two touch points calculated by the optical touch system 20 can be more accurate.

To sum up, in the optical touch system and the touch object separating method thereof of the present invention, when a single touch object and two touch objects are respectively appeared in two images captured by the two lenses of the optical touch system, the position and the width of the two touch objects in the single touch object image are calculated according to the ratio relationship of the two touch objects appeared in the image, so as to separate the single touch object image into two touch objects. Thus, the accuracy of the multi-touch recognition of the optical touch system can be improved.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A touch object separating method of an optical touch system, adapted to the optical touch system having a first lens, a second lens and a screen, wherein the first lens and the second lens are disposed on the same side of the screen and face toward another side of the screen, the method comprising:

recognizing at least one touch object image in a first captured image and a second captured image captured by the first lens and the second lens;

when the first captured image comprises two touch object images and the second captured image comprises a single touch object image, calculating a first distance between a leftmost end and a rightmost end of the two touch object images in the first captured image, a second distance between centers of the two touch object images, and a third distance between a leftmost end and a rightmost end of the single touch object image in the second captured image;

calculating a fourth distance corresponding to the third distance according to a ratio of the first distance to the second distance; and separating the single touch object image into two touch object images according to the forth distance, and combining with the two touch object images in the first captured image and the separated two touch object images in the second captured image to calculate positions of two touch points of the at least one touch object touching the screen.

2. The touch object separating method of the optical touch system as claimed in claim 1, wherein the ratio of the first distance to the second distance is equal to the ratio of the third distance to the fourth distance.

3. The touch object separating method of the optical touch system as claimed in claim 1, wherein the step of separating the single touch object image into two touch object images according to the forth distance comprises:

calculating a position of a center of the single touch object image in the second captured image; and calculating two positions of the center being moved left and right by a half of the fourth distance to serve as the positions of the centers of the separated two touch object images.

4. The touch object separating method of the optical touch system as claimed in claim 3, wherein the step of separating the single touch object image into two touch object images according to the forth distance further comprises:

calculating the positions of the centers of the two touch object images in the second captured image and a fifth distance between a leftmost end and a rightmost end of the single touch object image in the second captured image, and taking two times of the fifth distance as the width of the two touch object images respectively.

5. The touch object separating method of the optical touch system as claimed in claim 1, wherein the optical touch system is an optical touch monitor (OTM).

6. An optical touch system, comprising:

a screen;

a first lens and a second lens, disposed on the same side of the screen and facing toward another side of the screen for capturing at least one touch object above the screen; and a control unit, coupled to the first lens and the second lens, comprising:

an image recognizing module, configured to recognize the at least one touch object image in a first captured image and a second captured image captured by the first lens and the second lens;

a calculating module, when the first captured image comprises two touch object images and the second captured image comprises a single touch object image, configured to calculate a first distance between a leftmost end and a rightmost end of the two touch object images in the first captured image, a second distance between the centers of the two touch object images, a third distance between a leftmost end and a rightmost end of the single touch object image in the second captured image, and a fourth distance corresponding to the third distance according to a ratio of the first distance to the second distance;

a touch object separating module, configured to separate the single touch object image in the second captured image into two touch object images according to the fourth distance; and a touch point position calculating module, configured to combine the two touch object images in the first captured image and the separated two touch object images in the second captured image to calculate positions of two touch points of the at least one touch object touching the screen.

7. The optical touch system as claimed in claim 6, wherein the ratio of the first distance to the second distance is equal to the ratio of the third distance to the fourth distance.

8. The optical touch system as claimed in claim 6, wherein the touch object separating module comprises calculating a position of a center of the single touch object image in the second captured image, and calculating two positions of the center being moved left and right by a half of the fourth distance to serve as the positions of the centers of the separated two touch object images.

9. The optical touch system as claimed in claim 8, wherein the touch object separating module further calculating the positions of the centers of the two touch object images in the second captured image and a fifth distance between a leftmost end and a rightmost end of the single touch object image in the second captured image, and taking two times of the fifth distance as the width of the two touch object images respectively.

10. The optical touch system as claimed in claim 6, wherein the optical touch system is optical touch monitor.

\* \* \* \* \*